Feb. 23, 1932.  C. W. JOHNSON ET AL  1,846,258
CONVEYER APPARATUS
Filed Feb. 15, 1928   2 Sheets-Sheet 1
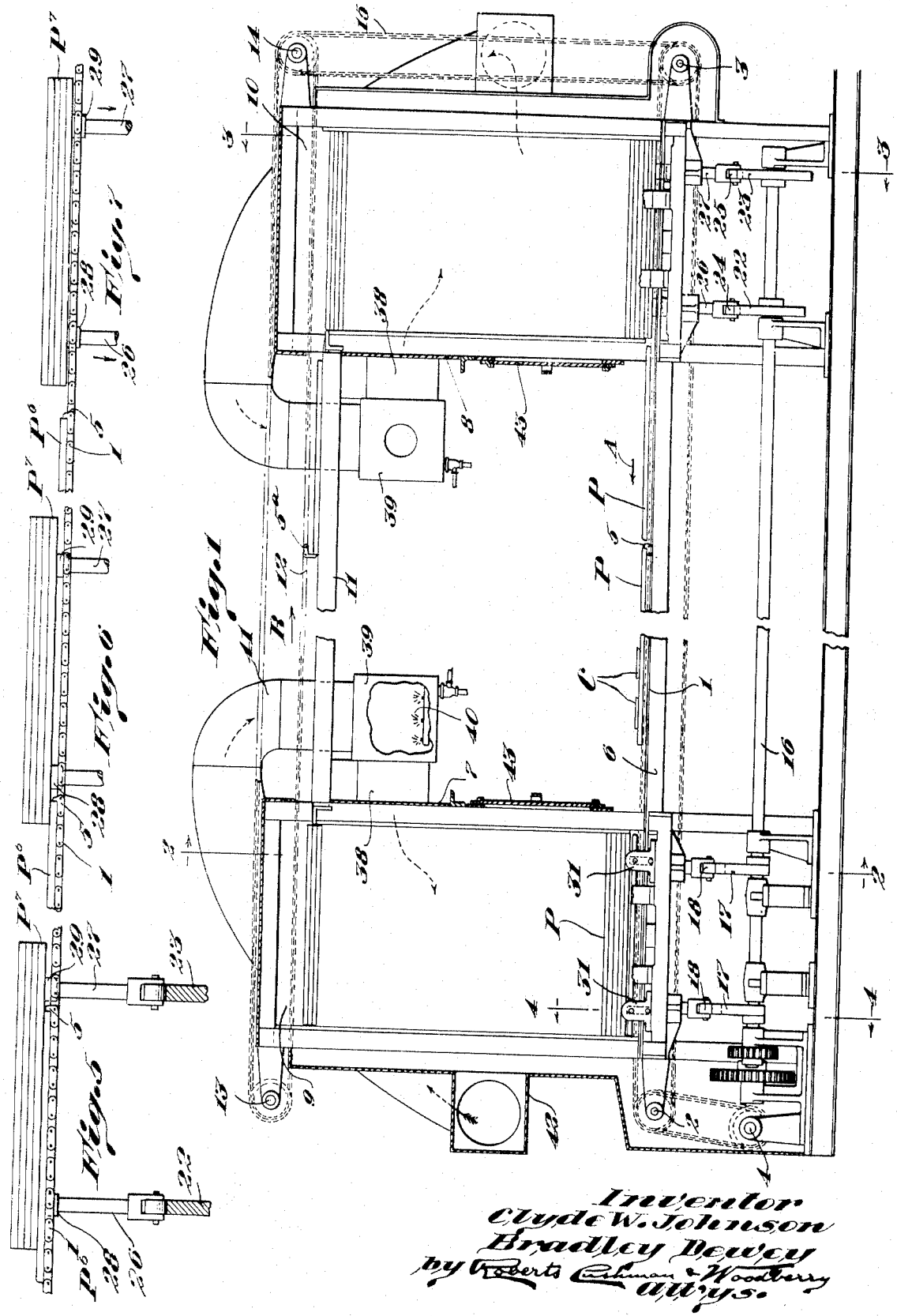
Inventor
Clyde W. Johnson
Bradley Dewey
by Roberts Cushman & Woodberry
Attys.

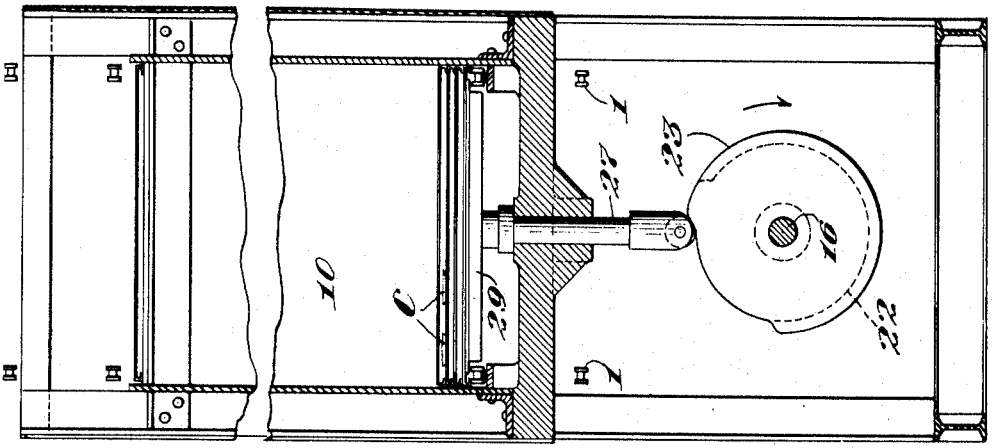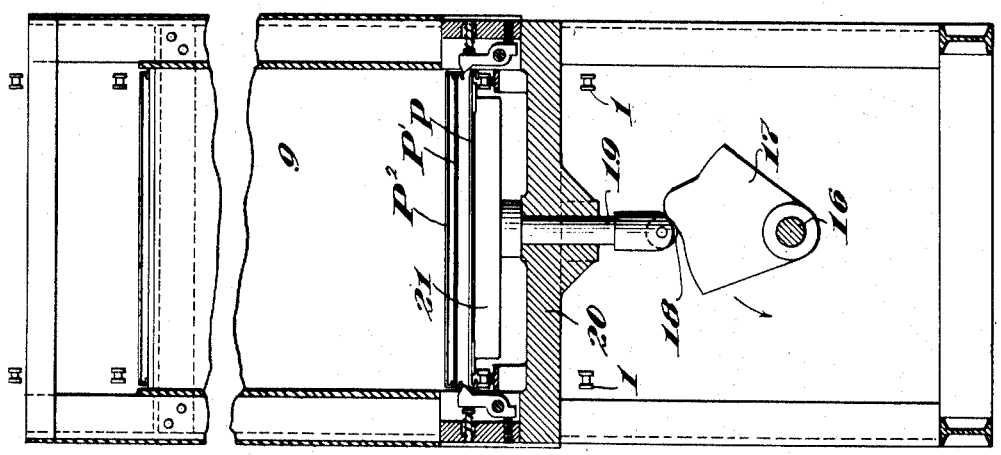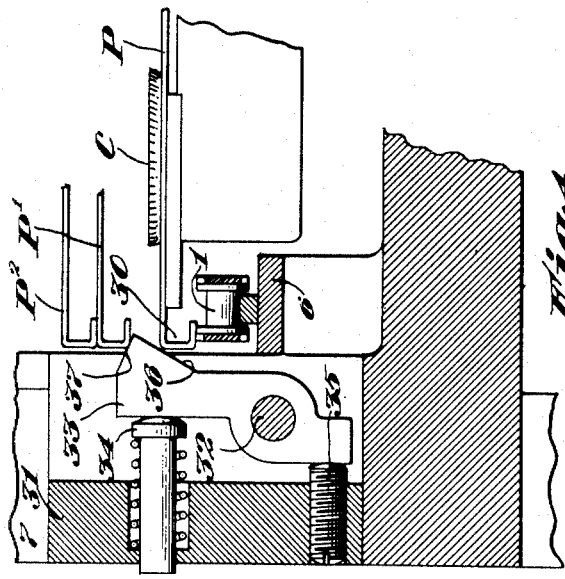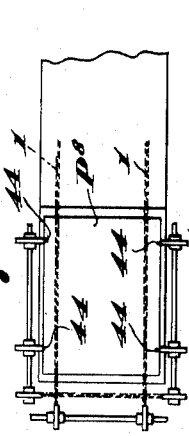

Patented Feb. 23, 1932

1,846,258

UNITED STATES PATENT OFFICE

CLYDE W. JOHNSON, OF SAUGUS, AND BRADLEY DEWEY, OF CAMBRIDGE, MASSACHUSETTS, ASSIGNORS TO DEWEY AND ALMY CHEMICAL COMPANY, OF CAMBRIDGE, MASSACHUSETTS, A CORPORATION OF MASSACHUSETTS

CONVEYER APPARATUS

Application filed February 15, 1928. Serial No. 254,401.

This invention pertains to conveyer apparatus and more particularly to apparatus for conveying articles or material, for example, receptacle covers or caps in a predetermined path while they are undergoing some treatment, for example drying, which requires a considerable period of time. In the manufacture of many articles or materials it is necessary, at some stage in the process, to subject them to prolonged drying, hydration, curing, etc. and when the other steps in the manufacturing process can be performed rapidly, this relatively slow step of drying, etc. presents a serious obstacle to quantity production, especially when the space available for manufacturing purposes is limited or very valuable. Commonly, the articles or materials to be dried or otherwise treated are placed upon an endless conveyer of suitable type passing through a chamber in which the treatment takes place, but it is obvious that if the conveyer moves rapidly enough to permit it to receive the articles or materials as fast as they are delivered from the preceding relatively rapid step in the process, the treating chamber must be very long in order to provide the necessary period of time for the treatment, and in many manufacturing establishments the requisite space is not available.

In accordance with the present invention we provide apparatus comprising means moving at a relatively rapid rate for receiving the articles as fast as they are delivered from the previous process step and which, after arranging successive articles or batches of articles in definite relation moves them at a very much slower rate while they are being treated and which preferably delivers them at substantially the same speed as the speed of reception, after the treatment is complete.

While as above suggested the apparatus herein disclosed is of general utility and may be employed in drying, curing, hydrating, smoke-treating, or the like, and whether the material to be treated take the form of articles of definite dimensions, or consist of unshaped lumps, fibre, powder, etc., we have here chosen to illustrate it as applied to the drying or treatment of disk-like articles such as receptacle covers or caps which have just previously received a coating of lining compound. To this end our improved conveyer apparatus is designed to handle the covers or caps in batches or groups, the covers or caps constituting each batch or group resting freely on a suitable support, for example a pallet, plate, or shallow pan hereinafter referred to, in most instances, simply as a pallet. After placing a batch of covers or caps upon one of the pallets by hand or automatically, for example as ejected from the coating mechanism, we advance the pallet rapidly in a substantially horizontal direction into the chamber where the covers are to be dried or otherwise treated. We then lift the pallet vertically and temporarily hold it in this elevated position while we advance a second pallet with its batch of covers below the first, and in raising the second pallet, cause it to lift the first pallet, through the intervention of suitable spacing elements disposed between the pallets. This procedure is repeated until we have built up a stack of predetermined height, it being evident that the average rate of upward movement of each pallet in the stack may be very slow compared with its rate of horizontal movement. For example, if it takes one-half minute to load a pallet with its batch of covers and to advance the loaded pallet horizontally into position beneath the stack, and if the spacer element, for instance, a vertical flange upon each pallet is substantially one-half inch in height, the delivery of each pallet to the bottom of the stack will result in raising the next pallet one-half inch and thus, if the stack comprise sixty pallets, it would occupy a vertical space of but thirty inches, although it will take each pan thirty minutes to progress from the bottom of the stack to the top.

While the pans are progressing slowly upward in the stack, the articles therein may be subjected to the action of any treating medium such, for example, as gas, hot air, moist air, or air laden with vapor of any desired character, such air or other gaseous medium being circulated, if desired, by means of a suction or pressure-developing device.

If the period of upward movement through this first stack is not sufficient to complete the drying or other treatment, we remove the pallets successively from the top of the stack, move them rapidly, preferably in a horizontal direction, and deposit them upon the top of another stack of pallets, permitting them to drop step-by-step at the same rate at which they were elevated in the first stack, preferably obtaining this movement by successive removal of the lowermost pallet from the second stack. While moving downwardly through the second stack the treatment may be repeated. Since the material is moved very slowly during the actual treating operation, the apparatus may be made of relatively small dimensions horizontally and requires no more than the normal head room available in usual factory buildings. Obviously, by repeating the above process, the drying period may be prolonged indefinitely without undue increase in the size of the apparatus.

In the accompanying drawings we have illustrated one desirable embodiment of the invention by way of example, it being understood that in its broader aspects the invention is not necessarily restricted to the specific arrangement or proportions of parts herein shown, and that equivalent elements may be substituted for those here illustrated without departing from the spirit of the invention.

In the drawings,

Fig. 1 is a vertical section of somewhat diagrammatic character, showing our invention as embodied in apparatus for drying small independent articles such, for example, as can covers;

Fig. 2 is a vertical section, partly broken away, substantially on the line 2—2 of Fig. 1;

Fig. 3 is a section similar to Fig. 2 but on the line 3—3 of Fig. 1;

Fig. 4 is a vertical section to larger scale on the line 4—4 of Fig. 1;

Figs. 5, 6 and 7 are diagrammatic sections, to larger scale, substantially on the same plane as Fig. 1, illustrating the sequence of operations of certain elements at the lower right hand part of Fig. 1; and Figs. 8, 9 and 10 are further diagrammatic views illustrating modified means for moving the articles.

The apparatus herein illustrated comprises an endless conveyer 1 which may be of any suitable type but which conveniently comprises a pair of parallel chains spaced apart horizontally a suitable distance, and having an upper substantially horizontal run moving in the direction of the arrow A in Fig. 1, preferably supported by fixed guide rails 6. This conveyer passes around sprocket wheels or other driving and supporting means, such wheels being carried by shafts 2 and 3 journalled in bearings in a suitable frame structure. One of these shafts, for example the shaft 2, is constantly driven, receiving its motion from a transverse drive shaft 4. The conveyer is provided at suitable intervals with projections or driving dogs 5 for a purpose hereinafter described.

When, as here illustrated, the apparatus is designed for drying or similarly treating material or articles, we preferably arrange the spaced casings 7 and 8 above the conveyer. These casings are preferably open at top and bottom and may conveniently be constructed of sheet material secured to a frame work of any desired construction. These casings define vertically elongate chambers 9 and 10 and the upper run 1 of the conveyer traverses the lower part of each of these chambers.

Substantially horizontal guides 11 extend from one casing to the other adjacent to their upper ends and a second endless conveyer chain 12 has its lower run disposed in a horizontal plane spaced slightly above the guides 11. This chain is provided with driving dogs or projections $5^a$ and passes about sprocket wheels or equivalent devices mounted upon shafts 13 and 14 journalled in bearings carried by the frame structure. One of these shafts, for example the shaft 14 is driven by means of a sprocket chain 15 passing about a sprocket wheel on the shaft 2. The direction of movement of the lower run of the upper conveyer chain 12 is indicated by the arrow B.

A cam shaft 16 extends longitudinally beneath the lower conveyer 1, such shaft being journalled in bearings carried by suitable brackets forming a part of the frame structure and this shaft is constantly rotated in timed relation to the movement of the conveyers. The shaft 16 carries a pair of cams 17 (Fig. 2) of substantially like contour, disposed below the chamber 9. These cams engage cam-follower rolls 18 at the lower ends of vertically sliding rods 19 arranged to reciprocate vertically in suitable openings in transverse frame members 20. The rods 19 are provided at their upper ends with transverse lifter bars 21 and as the shaft 16 rotates, the lifter bars 21 simultaneously rise and fall intermittently.

The shaft 16 also carries cams 22 and 23 (Figs. 1 and 3) disposed below the chamber 10. Cam 23 is provided with a relatively long active portion while the cam 22 is furnished with a shorter active portion. The cams 22 and 23 engage cam follower rolls 24 and 25 respectively, which are carried by vertically sliding rods 26 and 27 provided at their upper ends with lifter bars 28 and 29 respectively (Figs. 5, 6 and 7). As the shaft 16 rotates, the cam 23 first engages the follower roll 25, thus lifting the rod 27 and the corresponding bar 29 and holds the bar in this elevated position until after the continued rotation of the shaft has caused the cam 22 to elevate the bar 28 to a similar height, whereupon the cams 22 and 23 permit the bars 28 and 29 to descend simultaneously, the purpose of this arrangement being hereinafter described.

The lower part of the housing 7 is provided at its opposite sides with brackets 31 (Figs. 1 and 4) disposed adjacent to the upper run of the conveyer 1, and each bracket has bearings for a shaft 32 carrying a swinging dog or latch 33. The upper ends of these latches are urged inwardly by spring-pressed pins 34, and this inward movement is limited by adjustable stops 35. The latches are furnished with beveled actuating faces 36 and with pallet supporting faces 37.

When the apparatus is to be used for drying materials or articles, or for otherwise treating them with air, gas, or vapor, we provide each casing with an inlet conduit 38 for admitting the treating medium to the treating chamber. As here shown, where the apparatus is employed for drying, each conduit 38 leads from a heating chamber 39 in which the air or other medium may be warmed, as for example, by means of gas flames 40. While fresh air or other treating medium may be admitted directly to the chamber 39, we prefer to circulate the medium, or at least a portion thereof repeatedly through the casings so as to economize heat, and for this purpose we supply the air to the heating chambers 39 through conduits 41 which lead from outlet connections 42 at suitable points in the casings 7 and 8. In order to provide a forced circulation of the treating medium, we may employ a blower of either suction or pressure type, not shown, or any other means suitable for the purpose. To permit inspection of the material during the treating operation, we prefer to provide the casings 7 and 8 with doors 43 which may be opened at will and which, under certain circumstances may be left open to modify the treatment which the material is undergoing.

In accordance with the present disclosure the conveyer 1 supports a series of pallets P on which are placed the articles or materials to be treated. We have employed the term "pallet" as indicative of any suitable plate-like support adapted to rest upon the conveyer and to carry the articles while undergoing the treatment. Such pallets may be substantially flat or may take the form of shallow pans and in some cases the pallets may themselves constitute the articles to be treated, for example, they may be slabs of compressed or otherwise consolidated material. These pallets may be removed from the conveyer, if desired, and while so removed they may be loaded, either by hand or automatically, with the articles or material which is to be treated, and the loaded pallets may then be returned to the conveyer by hand or automatically. However, we prefer (unless the pallets themselves constitute the articles to be treated) to allow the pallets to remain upon the upper run of the lower conveyer 1 while they are being loaded and unloaded, and as above suggested the loading and unloading may be carried out by hand or by means of any suitable feed mechanism. For example, if the articles to be treated are receptacle covers or caps they may be delivered directly from the machine which applies the lining compound, lacquer, or other fluid or semi-fluid medium with which the covers are lined or coated.

The pallets P are provided at suitable points with vertically extending projections or spacers. As here shown these spacers take the form of downwardly directed flanges 30 at the opposite margins of the pallets, and these flanges sometimes rest upon the upper run of conveyer 1, at other times upon the guides 11, and when the pallets are stacked, these flanges or spacers keep the pallets in properly spaced relation. While the flanges 30, as here shown, project downwardly from the main body of the pallets, it is possible to arrange them to extend upwardly, and in the latter case they form side walls which assist in preventing the articles from slipping off edgewise from the pallets.

Assuming that a pallet P, resting on the upper run of the lower conveyer 1, has received a load of receptacle covers or caps C, the movement of the conveyer in the direction of the arrow A carries this loaded pallet rapidly into the lower part of the chamber 9. When the loaded pallet is wholly within the chamber, and before its advancing edge strikes the remote wall of the chamber, the rotation of the shaft 16 causes the cams 17 to elevate the lifter bars 21, thus quickly raising the loaded pallet from the conveyor and forcing it upwardly past the dogs or latches 33. The engagement of the edges of the pallet with the bevelled surfaces 36 presses the dogs backwardly to the dotted line position indicated in Fig. 4, and as the pallets rise above the dogs, the spring pressed pins 34 force the dogs back into normal position beneath the edges of the pallet, which now occupies the position P¹ in Fig. 4. The cams 17 immediately permit the lifter bars 21 to descend to a point below the conveyer 1 and as the next loaded pallet enters the lower part of the chamber 9, the above operation is repeated and this second pallet is lifted until it contacts with the pallet at the position P¹ and raises the latter until it occupies the position P², the last arriving pallet now occupying position P¹. The above sequence of operations is repeated as often as a loaded pallet is delivered by the conveyer 1 into the chamber 9, and thus a stack of pallets is built up in the chamber 9, adjacent pallets being held in vertically spaced relation by their flanges 30 and resting one upon another. As each new pallet enters the chamber, the pallets above are moved upwardly one step through a distance substantially equal to the vertical spacing of adjacent pallets, and as the vertical spacing of the pallets need be but little greater than the thickness of the articles to be treated, it is possible to stack up a very large number of pallets within a chamber of practicable vertical dimensions.

While the pallets are moving intermittently and at a relatively slow rate upwardly through the chamber 9, the articles carried by the pallet are subjected to the action of the drying or other medium which enters through the inlet 38 and which passes transversely across the chamber 9 through the spaces between the superposed pallets, such medium escaping through the outlet 42 and being recirculated with or without the addition of fresh treating medium.

As the uppermost pallet of the stack in the chamber 9 arrives at the position $P^4$, where it is substantially aligned with the upper surface of the guide 11, the upper conveyer 12 brings one of its driving dogs or projections $5^a$ into engagement with the left-hand edge of this pallet, as viewed in Fig. 1, and the rapidly moving conveyer slides this uppermost pallet horizontally onto the guides 11 and transfers it quickly over into the upper part of the chamber 10 where it is deposited upon the top of a stack of pallets previously formed within the chamber.

As the pallet enters the upper part of the chamber 10 and before its advancing edge engages the remote wall of such chamber, the stack of pallets in chamber 10 drops the thickness of one pallet, thus releasing the newly arriving pallet from the dog $5^a$. This drop of the stack is occasioned as follows: When the lower conveyer 1 brings one of its driving dogs into engagement with the right hand edge, as viewed in Fig. 1, of the lowermost pallet $P^6$ of the stack of pallets in the chamber 10, it immediately begins to move this lowermost pallet $P^6$ to the left as indicated in Fig. 5. As soon as the edge of the pallet $P^6$ has passed the vertical plane of movement of the lifter bar 29, (Fig. 5) the cam 23 raises the latter bar until it engages, slightly lifts, and supports the exposed right hand portion of the pallet $P^7$ next above the pallet $P^6$. As the driving dog 5 nears the left-hand side of the casing 8 (Fig. 6), the cam 22 raises the lifter bar 28 into engagement with the exposed left-hand portion of the pallet $P^7$ and preferably slightly lifts the latter to avoid pinching the lowermost pallet, and when the pallet $P^6$ has been removed completely from the chamber 10 (Fig. 7), the cams 22 and 23 permit the lifter bars 28 and 29 to move downwardly simultaneously at the same speed, thus permitting the pallet $P^7$ to descend and ultimately to rest upon the upper runs 1 of the conveyer chain in position for another driving dog 5 to engage its right-hand edge.

The pallets in the chamber 10 thus move downwardly step-by-step at substantially the same speed at which the pallets rise in the chamber 9, and as the pallets descend, the articles or materials carried thereby are subjected to the action of the drying or other medium circulating through the inlet 38, the chamber 10, the outlet 42 and the heating chamber 39. As the pallets move out of the chamber 10 on the conveyer 1, they may be unloaded by hand or automatically, or removed bodily from the conveyer, as may be preferred.

The apparatus above described causes the pallets and the articles mounted thereon to move in a substantially closed path comprising horizontal lower and upper runs and vertical runs connecting the ends of the horizontal runs and the pallets may be loaded and unloaded while on either of the conveyers 1 or 12, or loaded on one conveyer and unloaded on the other. The conveyers may be driven at a speed which is limited only by the proper loading and unloaded of the pallets, and it is thus possible to convey away material as fast as it is produced at the next previous step in the manufacturing process. For example, receptacle covers or caps from a lining machine may be delivered, as fast as they are lined, onto the moving pallets carried by the conveyer 1, the pallets being presented in succession to receive the covers or caps as fast as they are delivered by the lining machine. However, when the loaded pallets enter the chamber 9, their movement becomes very slow compared with that of the conveyer, and it is a simple and wholly practicable matter to design the apparatus in such a way that the articles will undergo the desired treatment for an hour or more without requiring an undue amount of floor space or an unusual amount of head room. Obviously, the pallets may be delivered from the top of the chamber 9 to the bottom of chamber 10 and progressed upwardly in the latter, if for any reason this is desirable or necessary. While it is preferred to drive the conveyers 1 and 12 continuously, it is within the scope of the invention to drive them intermittently.

While the simple arrangement above described is preferred, we may if desired raise and lower the pallets in one or both of the vertical portions of their path of travel by means of constantly or intermittently operating conveyer devices, dispensing. if desired, with the lifter cams above described. Thus, as shown diagrammatically in Figs. 8 and 9, we may employ vertically moving elevator chains 44 provided with dogs (either fixed or pivotally secured to the chain links) adapted to engage beneath a pallet which has been advanced by the conveyer chains 1 to the position P⁸ and to lift such pallet to the position P⁹, before advance of the next pallet by the chain 1. The movement of the chains 44 may be continuous or intermittent, as desired, and when such elevating means is provided for lifting or lowering the pallets in the casings 7 and 8, the spacer elements on the pallets may be omitted.

Instead of chains we may employ rotary conveyer screws 46 (Fig. 10) having threads of proper pitch to hold successive pallets P⁸ and P⁹ in the desired spaced relation, while raising or lowering them. These screws may extend from top to bottom of the casing or casings, or may extend only part way, the subsequent movement of the pallet, after disengagement from the elevator screws, being accomplished by contact with the adjacent pallet in the manner shown in Figs. 1 to 7 inclusive.

In the above description mention has been made from time to time of various utilities for the apparatus herein illustrated, but it is obvious that other uses may well be found for apparatus of this general type. Moreover, while certain specific mechanisms have been disclosed by which the desired results are obtainable, we wish it to be understood that the invention is not to be restricted to the specific features of construction here described and illustrated, but that various changes in proportion of parts, relative arrangements of the same, and the substitution of equivalents can be made without departing from the spirit of the invention.

We claim:

1. Apparatus of the class described comprising means for withdrawing the lowermost pallet of a stack of pallets in a horizontal direction out from beneath the superposed pallets, a plurality of vertically movable supports disposed beneath the stack of pallets, and means for moving said supports successively up into supporting contact with the under surface of the next to the lowest pallet in the stack as such pallet is progressively exposed by horizontal withdrawal of the lowermost pallet.

2. Apparatus of the class described comprising means for withdrawing the lowermost pallet of a stack of pallets in a horizontal direction out from beneath the superposed pallets, a plurality of vertically movable support disposed below the stack and spaced horizontally in the direction of movement of the lowermost pallet from the stack, and cam means for moving said supports successively upward into supporting engagement with the next to the lowermost pallet of the stack as such pallet is progressively exposed by withdrawal of the lowermost pallet, the cam means thereafter permitting all of the supports to descend simultaneously at the same speed thereby allowing the stack to move down while maintaining its constituent pallets horizontal.

3. Apparatus of the class described comprising an endless chain having a substantially horizontal run disposed beneath a stack of pallets and normally engaging the lowermost pallet of the stack, said chain having spaced projections adapted to engage the edge of the lowermost pallet and to drag it horizontally from below the stack, a pair of vertically movable supports disposed beneath the stack and spaced apart in the direction of movement of the conveyer, and a cam for actuating each support, said cams being so constituted and arranged as first to lift that support located beneath the end of the next to the lowest pallet which is first exposed by withdrawal of the lowermost pallet, and thereafter to lift the second support as the other end of the next to lowermost pallet is exposed, said cams thereafter permitting both supports to move downwardly simultaneously.

4. Apparatus of the class described comprising a conveyer for delivering article-supporting pallets horizontally into the lower part of a stack, means for moving the said stack upwardly step by step, an endless chain for moving successive topmost pallets from said stack to the top of a second stack, and vertically reciprocating means for temporarily supporting the pallets in the second stack to permit delivery of the lowermost pallet to the conveyer.

5. Apparatus of the class described comprising a conveyer for delivering article-supporting pallets horizontally into the lower part of one stack, means for moving said stack upwardly step by step, means for transferring successive topmost pallets from said stack to the top of a second stack, vertically reciprocating means for temporarily supporting the lowermost of the pallets in said latter stack in elevated position, the conveyer which delivers the pallets to the first chamber also passing beneath the second stack and receiving the lowermost pallet of the second stack at each downward reciprocation of said supporting means.

6. Apparatus for conveying pallets and the like comprising means for delivering pallets horizontally to the top of a stack of superposed pallets, means for withdrawing the lowermost pallet from the stack by moving it in an edgewise direction from below the next to the lowest pallet, and means operable in synchronism with said withdrawing means for engaging the bottom of said next to the lowermost pallet to support it while the lowermost pallet is being withdrawn.

7. Apparatus for conveying pallets and the like comprising means for delivering pallets horizontally to the top of a stack of superposed pallets, means for withdrawing the lowermost pallet from the stack by moving it in an edgewise direction from below the next to the lowest pallet, a vertically movable support disposed beneath the stack, and means for moving said support vertically into contact with the next to the lowest pallet before complete removal of the lowest pallet from the stack.

8. Apparatus for conveying pallets and the like comprising an upper horizontal conveyer for conveying pallets from the top of an upwardly moving stack to the top of a downwardly moving stack, a lower horizontal conveying device for removing pallets from the bottom of the downwardly moving stack and for supplying pallets to the bottom of the upwardly moving stack, a drive shaft beneath the lower horizontal conveying device, a vertically movable support operable by said shaft for controlling the downward movement of the pallets in the downwardly moving stack, and a vertically movable lifter device operable by said shaft for causing upward movement of the pallets in the upwardly moving stack.

9. In article-handling mechanism, means for forming a stack of articles, means for successively withdrawing the lowest article of the stack in a horizontal direction, and means for lifting the next lowest article from the lowest article while the latter is being withdrawn.

Signed by us at Cambridge, Mass., this 9th day of February, 1928.

CLYDE W. JOHNSON.
BRADLEY DEWEY.